United States Patent [19]

Moradi-Araghi

[11] Patent Number: 5,478,802
[45] Date of Patent: Dec. 26, 1995

[54] GELLING COMPOSITIONS USEFUL FOR OIL FIELD APPLICATIONS

[75] Inventor: Ahmad Moradi-Araghi, Bartlesville, Okla.

[73] Assignee: Phillips Petroleum Company, Bartlesville, Okla.

[21] Appl. No.: 997,846

[22] Filed: Dec. 29, 1992

[51] Int. Cl.$^6$ .................................. E21B 43/26
[52] U.S. Cl. .................. 507/203; 507/219; 507/225; 507/260; 507/267; 507/271; 507/935; 507/936; 507/209; 523/130
[58] Field of Search .................. 252/8.551; 523/130; 507/203, 219, 225, 260, 267, 271, 935, 939, 209

[56] References Cited

U.S. PATENT DOCUMENTS

| | | | |
|---|---|---|---|
| 3,727,688 | 4/1973 | Clampitt | 166/283 |
| 3,749,172 | 7/1973 | Hessert et al. | 166/274 |
| 4,012,352 | 3/1977 | Deyrup | 260/29.6 BM |
| 4,068,714 | 1/1978 | Hessert et al. | 166/246 |
| 4,197,186 | 4/1990 | Mumallah | 166/295 |
| 4,460,751 | 7/1984 | Hanlon et al. | 525/371 |
| 4,477,360 | 10/1984 | Almond . | |
| 4,515,216 | 5/1985 | Childs et al. . | |
| 4,524,828 | 6/1985 | Sabins et al. . | |
| 4,524,829 | 6/1985 | Hanlon et al. | 166/294 |
| 4,552,217 | 11/1985 | Wu et al. | 166/270 |
| 4,664,713 | 5/1987 | Almond et al. . | |
| 4,676,930 | 6/1987 | Shu et al. | 252/315.3 |
| 4,957,166 | 9/1990 | Sydansk | 166/295 |

FOREIGN PATENT DOCUMENTS

| | | | |
|---|---|---|---|
| 0273210 | 7/1988 | European Pat. Off. | E21B 33/138 |
| 484217 | 5/1991 | European Pat. Off. . | |
| 2187773 | 9/1987 | United Kingdom | E21B 33/138 |

OTHER PUBLICATIONS

Maureen Produced Water Injection, Society of Petroleum Engineers, Inc. SPE 26703, pp. 275–283. (1993).
Patton, "Applied Water Technology", (1st ed, 1991) by C. C. Patton, pp. 241–250.
Proc. SPE/DOE Seventh Symposium On Enhanced Oil Recovery (Sydansk, Apr. 1990) pp. 397–406.
Oil & Gas Journal (Rummo, Sep. 13, 1982), pp. 84 & 89.

*Primary Examiner*—Gary L. Geist
*Assistant Examiner*—Joseph D. Anthony
*Attorney, Agent, or Firm*—Lucas K. Shay

[57] ABSTRACT

A gelling composition and a process for wellbore treatment comprising injecting the composition into reservoirs are disclosed wherein the composition comprise a produced brine; a water-soluble polymer such as, for example, polyacrylamide; a crosslinker such as, for example, a complexed zirconium compound; and optionally a complexing ligand such as, for example, lactic acid.

40 Claims, No Drawings

GELLING COMPOSITIONS USEFUL FOR OIL FIELD APPLICATIONS

FIELD OF THE INVENTION

The present invention relates to a gelling composition and application therefor in oil field operations.

BACKGROUND OF THE INVENTION

It is well known to those skilled in the art that gelled or crosslinked water-soluble polymers are useful in enhanced oil recovery and other oil field operations. They have been used to alter the permeability of underground formations in order to enhance the effectiveness of water flooding operations. Generally, polymers along with an appropriate crosslinking system are injected in an aqueous solution into the formation. The polymers then permeate into and gel in the regions having the highest water permeability.

Because of environmental concerns as well as cost for disposing of a produced brine which is defined as the brine co-produced with oil and gas, it is desirable to utilize the produced brine as the aqueous solution used for the polymers and appropriate crosslinking system described above. Use of produced brines eliminates not only the cost associated with acquiring and pre-treating fresh water for use as the aqueous solution but, also the disposal cost for the produced brine. Most produced brines are known to be hard brines, i.e., those having a salinity of greater than 2% total dissolved solids, basically inorganic salts. Chromium(III) carboxylates such as, for example, chromium acetate are the only known crosslinkers which can be used to produce stable gels in produced brines for near-wellbore treatment. See for example R. D. Sydansk, *Acrylamide-Polymer/Chromium(III) -Carboxylate Gels for Near Wellbore Matrix Treatments*, Proceedings SPE/DOE Seventh Symposium on Enhanced Oil Recovery (1990). Although a chromium(III) salt is not as toxic as a chromium(VI) salt, it is not an environmentally desirable compound and its use may require additional costs to assure the integrity of the injection wells to avoid contamination of ground water sources.

There is, therefore, a need to develop a more environmentally suitable gelling composition that can form stable gels in produced brines for near-wellbore as well as in-depth treatments. It would also be a significant contribution to the art if a gelling composition does not crosslink too fast (i.e., gel times longer than 2 hours) so that individual components of the gelling composition can be injected simultaneously into the wells.

SUMMARY OF THE INVENTION

An object of the invention is to provide a gelling composition comprising produced brines having a high salinity. Another object of the invention is to provide a gelling composition that environmentally suitable for use in oil field operations. A further object of the invention is to provide a gelling composition that delays gelation process so that all components of the gelling compositions can be injected simultaneously. Still another object of the invention is to provide a process for near-wellbore treatment employing a gelling composition that is environmentally suitable for oil field operations. An advantage of the invention is the delayed gelation of the composition so that, for near-wellbore treatment, the components of the composition can be simultaneously injected. Another advantage of the invention is the use of high salinity produced brines to eliminate the necessity of treating or disposing of the brines. Other objects, features, and advantages will become more apparent as the invention is more fully disclosed hereinbelow.

According to an embodiment of the invention, a composition is provided which comprises a produced brine, a water-soluble polymer, a crosslinker, and optionally a complexing ligand.

According to another embodiment of the invention, a process for near-wellbore treatment in an oil field operation is provided which comprises injecting a produced brine, a water-soluble polymer, a crosslinker, and optionally a complexing ligand into an injection or producing well.

According to yet another embodiment of the invention, a process for in-depth treatment of an oil field is provided which comprises injecting sequentially a solution of polymer in a produced brine with a solution of crosslinker in the presence or absence of a complexing ligand into an injection or producing well.

DETAILED DESCRIPTION OF THE INVENTION

According to the first embodiment of the invention, a composition that is useful for near-wellbore treatment in oil field operations comprises a produced brine, a water-soluble polymer, a crosslinker, and optionally a complexing ligand. The near-wellbore treatment includes, but is not limited to, water shutoff, gas shutoff, and zone abandonment.

The produced brine employed in the composition of the invention is defined as the brine co-produced with oil or gas, or both, which generally is a hard brine, i.e., containing at least 1,000 ppm of $Ca^{+2}$, $Ba^{+2}$, $Mg^{+2}$, or $Sr^{+2}$, or combinations thereof. It generally contains high salinity of from about 1% to about 30% total dissolved solids. The composition of the invention also gels well in produced brines having a salinity of from about 3% to about 27%. To delay the rate of gelation so that the components of the composition can be injected at the same time without plugging up the injection or producing wells, a produced brine having a salinity of from 4% to 25% generally produces better results.

Polymers suitable for use in this invention are those capable of gelling in the presence of polyvalent metal ion crosslinking agents. Polymers suitable for use in this invention, i.e., those capable of gelling in the presence of crosslinking agents within a gelation pH range, include biopolysaccharides, cellulose ethers, and acrylamide-based polymers.

Suitable cellulose ethers are disclosed in U.S. Pat. No. 3,727,688 (herein incorporated by reference). Particularly preferred cellulose ethers include carboxymethylhydroxyethyl cellulose (CMHEC) and caroboxymethyl cellulose (CMC).

Suitable biopolysaccharides are disclosed in U.S. Pat. No. 4,068,714 (herein incorporated by reference). Particularly preferred is polysaccharide B-1459 and xanthan gums which are biopolysaccharides produced by the action of *Xanthomonas campestris* bacteria. This biopolysaccharide is commercially available in various grades under the tradename Kelzan® (Kelco Company, Los Angeles, Calif.) and Flocon 4800 (Pfizer, Groton, Conn.).

Suitable acrylamide-containing polymers which also contain small amounts of pendant carboxylate (acrylate) groups are disclosed in U.S. Pat. No. 3,749,172 (herein incorporated by reference). As used herein, the term "small amounts" refers to about 0.5 to 5 mole percent. Particularly preferred are the so-called partially hydrolyzed polyacrylamides possessing pendant carboxylate groups through which crosslinking can take place. Thermally stable polymers of acrylamide, such as copolymers of N-vinyl-2-pyrrolidone and acrylamide terpolymers of sodium-2-acrylamido-2-methylpropanesulfonate, acrylamide and N-vinyl-2-pyrrolidone, and copolymers of sodium-2-acrylamido-2-methyl-1-propanesulfonate and acrylamide, are particularly preferred for applications in high salinity environments at elevated temperatures. Selected terpolymers also are useful in the present process, such as terpolymers derived from acrylamide and N-vinyl-2-pyrrolidone comonomers with lesser amounts of termonomers such as vinyl acetate, vinylpyridine, styrene, methyl methacrylate, and other polymers containing acrylate groups.

Other miscellaneous polymers suitable for use in the present invention include partially hydrolyzed polyacrylonitrile, polystyrene sulfonate, lignosulfonates, methylolated polyacrylamides, and the like.

Presently preferred are CMC, xanthan gum, and the acrylamide based polymers, particularly the partially hydrolyzed polyacrylamides, polymers containing acrylamide, ammonium or alkali salt of acrylic acid, and polymers containing ammonium or alkali salt of acrylic acid, N-vinyl-2-pyrrolidone, and sodium-2-acrylamido-2-methylpropanesulfonate.

The crosslinker useful in the present invention is a metal compound selected from the group consisting of a complexed zirconium compound, a complexed titanium compound, and mixtures thereof. Examples of suitable crosslinker include, but are not limited to, ammonium zirconium fluoride, zirconium 2-ethylhexanoate, zirconium acetate, zirconium neodecanoate, zirconium acetylacetonate, tetrakis(triethanolamine)zirconate, zirconium carbonate, ammonium zirconium carbonate, zirconyl ammonium carbonate, titanium acetylacetonate, titanium ethylacetoacetate, zirconium lactate, titanium triethanolamine, ammonium titanium lactate, and combinations thereof. These compounds are commercially available.

The complexing ligand useful for the composition of the present invention to retard the rate of gelation is a carboxylic acid containing one or more hydroxyl groups and slats thereof or an amine that has more than one functional groups and contains one or more hydroxyl groups and that can chelate the zirconium or titanium moiety of the zirconium or titanium compounds described above. Examples of suitable complexing ligand include, but are not limited to, lactic acid, neutralized lactic acid, citric acid, ammonium, potassium or sodium citrate, isocitric acid, ammonium, potassium or sodium isocitrate, malic acid, ammonium, potassium or sodium malate, tartaric acid, ammonium, potassium or sodium tartrate, triethanolamine, malonic acid, ammonium, potassium or sodium malonate, and mixtures thereof. The presently preferred complexing ligands are citric acid, lactic acid, tartaric acid and salts thereof, and triethanolamine because of their ready availability and low cost.

The composition of the invention can be prepared by mixing the individual components together employing conventionally well-known mixing means. The order of adding individual components does not change the characteristics of the composition.

The concentration or amount of the water-soluble polymer in the aqueous solution can range widely and be as suitable and convenient for the various polymers, and for the degree of gelation needed for particular reservoirs. Generally, the concentration of polymer in its aqueous solution is made up to a convenient strength of about 100 to 20,000 ppm, preferably about 200 to 7,000 ppm.

Any suitable procedures for preparing the aqueous admixtures of the crosslinkable polymer can be used. Some of the polymers may require particular mixing conditions, such as slow addition of finely powdered polymer into the vortex of stirred brine, alcohol prewetting, protection from air (oxygen), preparation of stock solutions from fresh rather than salt water, or the like, as is known for such polymers.

The concentration of crosslinker in the composition depends largely on the concentration of polymer in the composition. Lower concentrations of polymer, e.g., require lower concentrations of crosslinker. Further, it has been found that for a given concentration of polymer, increasing the concentration of crosslinker generally substantially increases the rate of gelation. The concentration of crosslinker in the injected slug varies generally over the broad range of 25 ppm to 5,000 ppm, preferably over the range of 100 ppm to 2,000 ppm based on Zr or Ti concentration.

The concentration of the complexing ligand in the composition also depends on the concentrations of the water-soluble polymer in the composition and on the desired rate of gelation. Generally, the faster the gelation rate, the lower concentration of the complexing ligand is required. Generally, the concentration of the complexing ligand varies broadly in the range of about 25 ppm to about 5,000 ppm, preferably in the range of about 50 ppm to about 3,000 ppm, and most preferably in the range of 100 ppm to 2,000 ppm.

According to the second embodiment of the invention, a process for near-wellbore treatment in an oil field operation comprises simultaneously injecting a produced brine, a water-soluble polymer, a crosslinker and optionally a complexing ligand into an injection well. The definition and scope of the produced brine, water-soluble polymer, crosslinker and complexing ligand are the same as those described in the first embodiment of the invention. The water-soluble polymer, crosslinker and complexing ligand can also be injected sequentially without special order of injection, as long as they are first dissolved in the produced brine. In order to delay the gelation, however, it is preferred that the complexing ligand and crosslinker be mixed together in the produced brine prior to injecting.

The use of gelled polymers to alter the water permeability of underground formations is well known to those skilled in the art. Generally, an aqueous solution containing the polymer and a crosslinker is pumped into the formation so that it can diffuse into the more water swept portions of the formation and alter water permeability by gelling therein.

The present :invention can be used in a similar manner. An aqueous solution of the composition of the present invention can be pumped into the formation so that it alters the water permeability of the formation in a similar manner when gelation takes place. The aqueous solution containing the water soluble polymer and a zirconium or titanium crosslinker solution in the presence or absence of the complexing ligand can be pumped into the formation in one slug, or alternatively the components may be sequentially injected in a manner to provide an appropriate concentration in the formation.

The nature of the underground formation treated is not critical to the practice of the present invention. The described gelable composition can be injected into a formation having a temperature range of from about 70° F. to about 300° F. when the polymer used is a copolymer having the repeating units derived from at least one monomer selected from the group consisting of N-vinyl-2-pyrrolidone, sodium-2-acrylamido-2-methylpropane sulfonate, acrylamide, an alkali salt of acrylic acid and combinations thereof; or a temperature in the range of from about 70° F. to about 200° F. for partially hydrolyzed polyacrylamide, xanthan gum, CMC, or CMHEC, preferably about 80° F. to about 180° F., and most preferably 90° F. to 170° F.

Examples provided hereinbelow are intended to assist one skilled in the art to further understand the invention and should not be considered limitative.

EXAMPLE I

The purpose of this example is to illustrate the gelation of a composition comprising a water-soluble polymer, a crosslinker and a brine, and to use this example as a control.

Polyacrylamide solutions (0.5%) were prepared by mixing sufficient amount of the polymer in a synthetic brine having 1.1%, total dissolved solids (TDS; 1% NaCl and 0.1% $CaCl_2$), 11% TDS (10% NaCl and 1% $CaCl_2$), and 22% TDS (20% $NaCl_2$ and 2% $CaCl_2$). Then 20 ml samples of each polymer solution were placed in three vials. Each vial was then charged with tetrakis(triethanolamine)zirconate. The vials were placed upright in test tube racks and then placed in ovens heated to and held at 120° F. Periodically, the ampules were removed from the oven and the mechanical strength of the gels was determined.

As crosslinking developed, small microgels of granules began to appear, i.e., a very slight gel formed. Continued growth of the microgels to globule occurred next, referred to as slight gel. Larger gel masses next appeared, referred to as partial gel, followed by the development of stronger gels with measurable tongue lengths. The tongue lengths were measured by placing each vial horizontally allowing the hot gelling composition to flow to its equilibrium position and then measuring the length of the tongue formed. As gelation progressed with time, stronger gels and shorter tongue lengths were developed. The gel strength is expressed mathematically as Percent Gel Strength=(AL−TL)×100/AL where AL equals ampule length (in centimeters), and TL equals the tongue length of the gel measured in centimeters from the point at which the gel contacts the entire circumference of the tube to the farthest point to which the gel has spread. Thus the strongest gels would have a gel strength of 100% and the weakest gels would have a gel strength of 0. The gel strength results are shown in Table I.

TABLE I

Gelation of Polyacrylamide[a] in Brines with 250 ppm Zirconium (Zirtech TE[b]) at 120° F.

| In 1.1% Brine | | In 11% Brine | | In 22% Brine | |
|---|---|---|---|---|---|
| Aging Time (days) | Gel Strength (%) | Aging Time (days) | Gel Strength (%) | Aging Time (days) | Gel Strength (%) |
| 0.06 | 0.00 | 0.07 | 64.4 | 0.06 | 84.0 |
| 0.15 | 64.9 | 0.17 | 70.7 | 0.16 | 84.0 |
| 0.81 | 71.6 | 0.84 | 77.3 | 0.84 | 86.7 |
| 2.90 | 78.7 | 3.90 | 80.4 | 3.90 | 87.1 |
| 4.90 | 81.3 | 5.90 | 83.6 | 5.80 | 87.6 |
| 7.00 | 81.3 | 7.90 | 84.4 | 7.80 | 88.4 |
| 11.30 | 83.6 | 14.90 | 85.3 | 14.90 | 90.7 |
| 18.20 | 84.4 | 22.00 | 86.2 | 21.90 | 88.9 |
| 25.20 | 84.0 | 29.00 | 87.1 | 28.90 | 91.1 |
| 32.00 | 86.2 | 36.00 | 87.1 | 36.00 | 91.1 |
| 39.00 | 86.2 | 43.00 | 85.8 | 43.00 | 91.6 |
| 46.00 | 87.6 | 77.00 | 87.1 | 70.00 | 90.7 |
| 53.00 | 88.4 | 152.00 | 85.8 | 146.00 | 77.8 |
| 87.00 | 88.4 | 246.00 | 82.7 | 193.00 | 77.8 |
| 162.00 | 88.4 | | | | |
| 256.00 | 88.4 | | | | |

[a]Polymer used was Polydia 1041 (% hydrolysis = 3–6; inherent viscosity = 18 dL/g) obtained from Nilto Chemical Industry Co., Tokyo, Japan.
[b]Zirtech TE is a triethanolamine complex of Zirconium obtained from Benchmark Research and Technology, Inc., Midland, Texas.

The results shown in Table I indicate that increasing the salinity of the brides from 1.1% to 22% significantly increased the gelation rate. For example, aging for 1.4 hours (0.06 day), the gel strength in 1.1% brine was 0.0 The gel strength in 22% brine, for same aging period, increased to 84%. However, upon prolonged incubation, the gels formed in lower salinity brine appears to have stronger gels than those formed in higher salinity brines. For example, upon gelling for 256 days in 1.1% brine, the gel strength was 88.4%. On the other hand, upon gelling for 193 days in 22% brine, the gel strength was only 77.8%.

EXAMPLE II

This example illustrates the gelation of water-soluble polymer with a complexed zirconium compound in a produced brine.

The runs were carried out the same as those described in Example I with the exception that the brine used as a produced brine obtained from Tank Battery 41 of North Burbank Unit Oil Field, Shidler, Okla. the produced brine has a TDS of 5%. Gel strength of the gels aged at 120° F., 150° F. and 175° F. is shown in Table II.

TABLE II

Gelation of Polyacrylamide in a Produced Brine with Zirtech TE (250 ppm Zr) at 120° F., 150° F. and 175° F.

| Aging Time (days) | Gel Strength (%) | | |
|---|---|---|---|
| | 120° F. | 150° F. | 175° F. |
| 0.06 | 0.0 | 65.8 | 84.9 |
| 0.17 | 0.0 | 74.7 | 92.4 |
| 0.83 | 67.6 | 83.6 | 94.2 |
| 1.20 | 72.4 | 85.3 | 95.1 |
| 1.90 | 74.2 | 87.1 | 96.0 |
| 2.80 | 77.8 | 88.4 | 95.6 |
| 7.80 | 80.4 | 89.8 | 96.4 |
| 20.00 | 83.6 | 91.6 | 96.9 |
| 26.90 | 84.9 | 92.4 | 97.3 |
| 34.00 | 84.9 | 92.0 | 96.9 |
| 49.00 | 86.2 | 93.8 | 91.1 |
| 66.00 | 87.6 | 93.3 | 86.2 |
| 97.00 | 89.3 | 93.8 | Syneresis |
| 125.00 | 88.4 | 93.8 | Syneresis |

Table II shows that the lower the aging temperature, the slower the gelation rate. For instance, no gel was observed at 120° F. until after the gelling composition had been aged for more than 4.1 hours (0.17 day). It gelled, however, within 1.4 hours of aging at 150° F. as well as at 175° F. Table II further indicates that the gelation rate at higher temperature, i.e. 150° F. to 175° F., needed to be delayed so that the components of the gelling composition can be simultaneously injected into an oil well.

EXAMPLE III

This example shows the effect of crosslinker pH on the gelation of polyacrylamide in a produced brine.

The runs were carried out the same as described in Example II except that the crosslinker pH was adjusted to the values shown in Table III using a 20–25% NaOH solution. The aging was done at 120° F. only. The results are shown in Table III.

TABLE III

Effect of pH on Gelation Polyacrylamide in a Produced Brine with Zirtech TE (250 ppm Zr) at 120° F.

| Aging Time | Gel Strength (%) at pH | | |
|---|---|---|---|
| (days) | 6.7 | 7.34 | 8.07 |
| 0.05 | 58.7 | 0.0 | 0.0 |
| 0.17 | 69.8 | 0.0 | 0.0 |
| 0.83 | 78.2 | 59.7 | 0.0 |
| 1.80 | 78.7 | 60.0 | 0.0 |
| 4.10 | 79.6 | 59.6 | 0.0 |
| 33.00 | 80.0 | 71.1 | 0.0 |
| 70.00 | 80.9 | | |

Table III indicates that for prolonged aging at 120° F. a pH higher than 7.34 was not suit;able. Table III further indicates that the gelation rate can also be adjusted by adjusting the pH of crosslinker solution.

EXAMPLE IV

This example demonstrates that the gelation rate of a gelling composition comprising polymer and a complexed zirconium compound in a produced brine can be reduced by adding a complexing ligand to the gelling composition.

All runs shown in Table IV below were carried out the same as those described in Example II except that malonic acid was added to the composition (to a final concentration of 400 ppm) before aging at 120° F. Results are shown in Table IV.

TABLE IV

Effect of Malonic Acid on Gelation of Polyacrylamide in a Produced Brine Zirtech TE at 120° F.

| Aging Time | Gel Strength (%) | |
|---|---|---|
| (days) | No Acid | With Acid |
| 0.05 | 64.4 | 0.0 |
| 0.12 | 75.6 | 71.1 |
| 0.19 | 78.2 | 77.8 |
| 0.84 | 81.3 | 84.9 |
| 4.10 | 83.6 | 88.0 |
| 10.10 | 84.4 | 90.2 |
| 39.00 | 85.3 | 92.9 |

TABLE IV-continued

Effect of Malonic Acid on Gelation of Polyacrylamide in a Produced Brine Zirtech TE at 120° F.

| Aging Time | Gel Strength (%) | |
|---|---|---|
| (days) | No Acid | With Acid |
| 76.00 | 87.1 | 94.7 |

The results shown in Table IV demonstrate that the gelation rate of the composition was developed. In the presence of 400 ppm malonic acid, the gelling Composition did not form gels until after being aged for at least 1.2 hours (0.05 day).

EXAMPLE V

This example illustrates that a complexed titanium compound can also be used to gel polyacrylamide in a produced brine and the effect of a complexing ligand on the gelation rate of the titanium-containing gelling composition.

All runs shown in Table V were carried out the same as those described in Example IV except that titanium lactate was used in place of the tetrakis(triethanolamine) zirconate and sodium citrate was used in place of malonic acid. The gelling results are shown in Table V.

TABLE V

Effect of Sodium Citrate on Gelation of Polyacrylamide in a Produced Brine with Tyzor LA[a] 500 ppm Ti) at 120° F.

| Aging Time | Gel Strength (%) | | |
|---|---|---|---|
| (days) | 0 ppm Na-Cit | 183 ppm Na-Cit | 427 ppm Na-Cit |
| 0.05 | 0.0 | 0.0 | 0.0 |
| 0.10 | 68.0 | 0.0 | 0.0 |
| 0.15 | 70.2 | 0.0 | 0.0 |
| 0.80 | 79.6 | 0.0 | 0.0 |
| 1.80 | 82.2 | 62.7 | 0.0 |
| 11.10 | 80.0 | 72.0 | 0.0 |
| 32.00 | 81.3 | 71.1 | 0.0 |
| 46.00 | 80.4 | 72.4 | 0.0 |
| 77.00 | 80.4 | 68.4 | 0.0 |
| 211.00 | 80.4 | 72.0 | 63.1 |

[a]Tyzor LA is a titanium lactate commercially available from duPont, Wilmington, Delaware.

Table V shows that a complexed titanium compound is also effective on gelling polyacrylamide in a produced brine. Table V further shows that sodium citrate (Na-Cit) significantly delay the gelation of the composition. In the absence of sodium citrate, the composition gelled within 2.4 hours (0.1 day). With 183 ppm of sodium citrate present in the composition, the composition did not gel until after it had been aged for at least 19.2 hours (0.8 day). The effect of sodium citrate was even more profound at higher concentrations. For example, at 427 ppm sodium citrate present, the composition did not gel until after the composition had been aged for at least 77 days.

EXAMPLE VI

This example demonstrates that lactic acid can also be used in a gelling composition comprising polyacrylamide and a complexed zirconium compound, in a produced brine.

The runs were carried out the same as those described in Example IV except that zirconium lactate was used as the crosslinker and lactic acid was used instead of malonic acid as the complexing ligand. Results presented in Table VI indicate that, similar to sodium titrate (Example V), lactic acid was also an effective complexing ligand for delaying the gelation of a gelling composition.

TABLE VI

Gelation of Polyacrylamide in a Produced Brine with 283 ppm Zr(Zirconium Lactate, Zirtech LA[a]) at 120° F.

| 0 ppm Lactic Acid | | 1650 ppm Lactic Acid | |
| --- | --- | --- | --- |
| Aging Time (days) | Gel Strength (%) | Aging Time (days) | Gel Strength (%) |
| 0.04 | 0.0 | 0.04 | 0.0 |
| 0.14 | 72.0 | 0.08 | 0.0 |
| 0.22 | 74.7 | 0.16 | 0.0 |
| 0.89 | 78.2 | 0.27 | 0.0 |
| 5.90 | 82.2 | 0.88 | 0.0 |
| 10.20 | 82.2 | 1.10 | 0.0 |
| 13.20 | 82.7 | 2.20 | 0.0 |
| 20.90 | 78.7 | 3.20 | 0.0 |
| 38.00 | 83.1 | 6.20 | 0.0 |
| 59.00 | 82.7 | 13.90 | 0.0 |
| 104.00 | 84.4 | 31.00 | 69.8 |
| 240.00 | 83.1 | 52.00 | 82.2 |
| | | 97.00 | 89.3 |
| | | 233.00 | 95.6 |

[a]Zirtech LA is a zirconium lactate obtained from Benchmark Research and Technology, Inc., Midland, Texas.

EXAMPLE VII

This example illustrates the effect of triethanolamine on the gelation rate of the invention composition.

The runs were carried out the same as those described in Example II except that additional triethanolamine (300 ppm) was added to the composition and that the Zr concentration was 279 ppm. The results in Table VII show that triethanolamine was very effective on delaying the gelation of the gelling composition. For instance, no gel was formed, in the presence of the additional triethanolamine, until after the composition was aged for at least 2.9 days. Without additional triethanolamine, the gelling composition galled in less than 4.6 hours (0.19 day).

TABLE VII

Effect of Triethanolamine (TE) on Gelation of Polyacrylamide in a Produced Brine with 279 ppm Zirtech TE at 120° F.

| Aging Time | Gel Strength (%) | |
| --- | --- | --- |
| (days) | 0 ppm TE | 300 ppm TE |
| 0.07 | 0.0 | 0.0 |
| 0.19 | 66.2 | 0.0 |
| 0.84 | 79.1 | 0.0 |
| 1.90 | 79.6 | 0.0 |
| 2.90 | 81.8 | 0.0 |
| 6.20 | 83.1 | 59.1 |
| 9.10 | 84.0 | 59.6 |
| 29.00 | 86.7 | 64.9 |
| 41.00 | 87.1 | 66.7 |
| 69.00 | 89.3 | 68.0 |
| 106.00 | 88.4 | 69.3 |

EXAMPLE VIII

This example shows that sodium tartrate is also an effective complexing ligand on delaying the gelation.

The runs were carried out the same as those described in Example VI except that the produced brine used was obtained from Tank Battery 57 from North Burbank Unit, had 10% TDS and that sodium tartrate (Na-Tart) instead of lactic acid was added to the gelling composition. Table VIII below demonstrates, without Na-Tart in the composition, the gelling composition gelled almost instantly. The composition, however, did not gel until after it had been aged for at least 3.1 hours (0.13 day).

TABLE VIII

Effect of Sodium Tartrate on Gelation of Polyacrylamide in a Produced Brine with Zirtech LA (250 ppm Zr) at 250° F.

| Aging Time | Gel Strength (%) | |
| --- | --- | --- |
| (days) | 0 ppm Na-Tart | 300 ppm Na-Tart |
| 0.04 | 79.1 | 0.0 |
| 0.08 | 84.0 | 0.0 |
| 0.13 | 84.4 | 0.0 |
| 0.17 | 86.2 | 60.0 |
| 0.80 | 88.9 | 72.8 |
| 1.80 | 88.9 | 76.4 |
| 4.80 | 90.2 | 78.7 |
| 6.90 | 90.7 | 80.0 |
| 11.80 | 92.0 | 78.7 |
| 15.80 | 92.0 | 79.1 |
| 19.80 | 92.4 | 79.6 |
| 29.10 | 91.6 | 78.7 |

EXAMPLE IX

This example illustrates that sodium acetate is not an effective complexing ligand for delaying gelation of the invention composition.

The runs were carried out the same as those described in Example VIII except that sodium acetate (Na-Acet) was used in place of sodium tartrate. The results are shown in Table IX.

TABLE IX

Effect of Sodium Acetate on Gelation of Polyacrylamide in a Produced Brine with Zirtech LA (250 ppm Zr) at 120° F.

| Aging Time | Gel Strength (%) | |
| --- | --- | --- |
| (days) | 0 ppm Na-Acet | 300 ppm Na-Acet |
| 0.04 | 79.5 | 75.1 |
| 0.08 | 82.7 | 81.3 |
| 0.13 | 84.9 | 84.0 |
| 0.17 | 84.9 | 84.0 |
| 0.87 | 88.0 | 88.9 |
| 4.80 | 91.1 | 90.7 |
| 5.90 | 90.7 | 90.7 |
| 10.90 | 90.2 | 89.8 |
| 18.90 | 92.0 | 91.1 |
| 28.10 | 92.0 | 90.7 |

Table IX shows that gelling composition gelled almost instantly upon aging, even in the presence of 978 ppm sodium acetate in the composition.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as That which is claimed is:

1. A process for wellbore treatment consisting essentially of: (1) producing a produced brine which is a recovered brine which is coproduced and contaminated with oil or gas or both; (2) preparing a composition consisting essentially of said produced brine, a water-soluble polymer, a complexing ligand, and a crosslinker; and (3) injecting said composition to said wellbore wherein said complexing ligand is selected from the group consisting of lactic acid, neutralized lactic acid, citric acid, ammonium citrate, sodium citrate, potassium citrate, isocitric acid, ammonium isocitrate, sodium citrate, potassium citrate, tartaric acid, ammonium tartrate, sodium tartrate, potassium tartrate, triethanolamine, malonic acid, ammonium malonate, sodium malonate, potassium malonate, and mixtures thereof; and said crosslinker is selected from the group consisting of complexed zirconium compounds, complexed titanium compounds, and combinations thereof.

2. A process according to claim 1 wherein said wellbore treatment comprises water shutoff, gas shutoff, and zone abandonment.

3. A process according to claim 1 wherein said crosslinker is selected from the group consisting of ammonium zirconium fluoride, zirconium 2-ethylhexanoate, zirconium acetate, zirconium neodecanoate, zirconium acetylacetonate, tetrakis(triethanolamine)zirconate, zirconium carbonate, ammonium zirconium carbonate, zirconyl ammonium carbonate, titanium acetylacetonate, titanium ethylacetoacetate, zirconium lactate, titanium triethanolamine, ammonium titanium lactate, and combinations thereof.

4. A process according to claim 1 wherein said crosslinker is a complexed zirconium compound.

5. A process according to claim 1 wherein said crosslinker is a complexed titanium compound.

6. A process according to claim 1 wherein said complexing ligand is lactic acid.

7. A process according to claim 1 wherein said water-soluble polymer is selected from the group consisting of a biopolysaccharide a cellulose ether, an acrylamide-containing polymer containing about 0.5 to about 5 mole percept of carboxylate groups, and combinations thereof.

8. A process according to claim 7 wherein said water-soluble polymer is an acrylamide-containing polymer.

9. A process according to claim 8 wherein said water-soluble polymer is partially hydrolyzed polyacrylamide.

10. A process according to claim 1 wherein the salinity of said produced brine is in the range of from about 1% to about 30% of total dissolved solids.

11. A process according to claim 10 wherein said range is from about 3% to about. 27% of total dissolved solids.

12. A process according to claim 11 wherein said range is from 4% to 25% of total dissolved solids.

13. A process according to claim 1 wherein the concentration of said water-soluble polymer in said produced brine is in the range of from bout 100 ppm to about 20,000 ppm.

14. A process according to claim 13 wherein said concentration is in the range of from about 200 ppm to about 7,000 ppm.

15. A process according to claim 1 wherein the concentration of said crosslinker in said produced brine is in the range of from about 25 ppm to about 5,000 ppm.

16. A process according to claim 15 wherein said concentration is in the range of from 100 ppm to 2,000 ppm.

17. A process according to claim 1 wherein said composition is injected into an oil or gas well in a temperature range of from about 80° F. to about 200° F.

18. A process according to claim 14 wherein said temperature range is from 100° F. to 170° F.

19. A process according to claim 1 wherein the concentration of said complexing ligand in said produced brine is in the range of from about 25 ppm to about: 5,000 ppm.

20. A process according to claim 19 wherein said concentration is in the range of from 100 ppm to 2,000 ppm.

21. A process for near-wellbore treatment comprising the steps of: (1) producing a produced brine which is a recovered brine which is coproduced and contaminated with oil or gas or both; (2) injecting said produced brine, a partially hydrolyzed polyacrylamide, zirconium lactate, and lactic acid into a reservoir wherein the concentration of partially hydrolyzed polyacrylamide in said produced brine is in the range of from 200 ppm to 5,000 ppm; the concentration of zirconium lactate in said produced brine is in the range of from 100 ppm to 2,000 ppm zirconium; the concentration of lactic acid in said produced brine is in the range of from 100 ppm to 2,000 ppm; and said produced brine has a salinity of 4% to 25% total dissolved solids.

22. A process according to claim 1 wherein said composition is injected into an oil or gas well in a temperature range of from about 70° F. to about 300° F. and wherein said polymer is a copolymer having the repeating units derived from monomers selected from the groups consisting of acrylamide, N-vinyl-2-pyrrolidone, sodium 2-acrylamido-2-methylpropane sulfonate, acrylic acid, an alkali salt of acrylic acid, and combinations thereof.

23. A process according to claim 22 wherein said temperature range is from about 150° F. about 250° F.

24. A composition consisting essentially of a produced brine, a water soluble polymer, a complexing ligand, and a crosslinker wherein said produced brine is a recovered brine which is coproduced and contaminated with oil or gas or both; said complexing ligand is selected from the group consisting of lactic acid, neutralized lactic acid, citric acid, ammonium citrate, sodium citrate, potassium citrate, isocitric acid, ammonium isocitrate, sodium citrate, potassium citrate, tartaric acid, ammonium tartrate, sodium tartrate, potassium tartrate, triethanolamine, malonic acid, ammonium malonate, sodium malonate, potassium malonate, and mixtures thereof; and said crosslinker is selected from the group consisting of complexed zirconium compounds, complexed titanium compounds, and combinations thereof.

25. A compositions according to claim 24 wherein said water-soluble polymer is selected from the group consisting of a biopolysaccharide, a cellulose ether, an acrylamide-containing polymer containing about 0.5 to about 5 mole percent of carboxylate groups, and combinations thereof.

26. A composition according to claim 24 wherein said water-soluble polymer is an acrylamide-containing polymer.

27. A composition according to claim 24 wherein said water-soluble polymer is partially hydrolyzed polyacrylamide.

28. A composition according to claim 24 wherein said crosslinker is selected from the group consisting of ammonium zirconium fluoride, zirconium 2-ethylhexanoate, zirconium acetate, zirconium neodecanoate, zirconium acetylacetonate, tetrakis(triethanolamine)zirconate, zirconium carbonate, ammonium zirconium carbonate, zirconyl ammonium carbonate, titanium acetylacetonate, titanium ethylacetoacetate, zirconium lactate, titanium triethanolamine, ammonium titanium lactate, and combinations thereof.

29. A composition according to claim 24 wherein said crosslinker is a complexed zirconium compound.

30. A composition according to claim 24 wherein said crosslinker is a complexed titanium compound.

31. A composition according to claim 24 wherein said complexing ligand is lactic acid.

32. A composition according to claim 24 wherein the salinity of said produced brine is in the range of from about 1% to about 30% of total dissolved solids.

33. A composition according to claim 32 wherein said range is from 4% to 25% of total dissolved solids.

34. A composition according to claim 24 wherein the concentration of said water-soluble polymer in said produced brine is in the range of from about 100 ppm to about 20,000 ppm.

35. A composition according to claim 34 wherein said concentration is in the range of from about 200 ppm to about 7,000 ppm.

36. A composition according to claim 24 wherein the concentration of said crosslinker in said produced brine is in the range of from about 25 ppm to about 5,000 ppm.

37. A composition according to claim 36 wherein said concentration is in the range of from 100 ppm to 2,000 ppm.

38. A composition according to claim 24 wherein the concentration of said complexing ligand in said produced brine is in the range of from about 25 ppm to about 5,000 ppm.

39. A composition according to claim 38 wherein said concentration is in the range of from 100 ppm to 2,000 ppm.

40. A composition useful for wellbore treatment consisting essentially of a produced brine, a partially hydrolyzed polyacrylamide, zirconium lactate, and lactic acid wherein the concentration of said partially hydrolyzed polyacrylamide in said produced brine is in the range of from 200 ppm to 5,000 ppm; the concentration of zirconium lactate in said produced brine is in the range of from 100 ppm to 2,000 ppm zirconium; the concentration of lactic acid in said produced brine is in the range of from 100 ppm to 2,000 ppm; and said produced brine is a recovered brine which is coproduced with oil or gas or both and has a salinity of 4% to 25% total dissolved solids.

* * * * *